United States Patent
Park et al.

(10) Patent No.: US 8,548,103 B2
(45) Date of Patent: Oct. 1, 2013

(54) METHOD AND APPARATUS OF ADAPTIVE TRANSMISSION SIGNAL DETECTION BASED ON SIGNAL-TO-NOISE RATIO AND CHI-SQUARED DISTRIBUTION

(75) Inventors: In Sook Park, Daejeon-si (KR); Kwang Jae Lim, Daejeon-si (KR); Dong Seung Kwon, Daegu-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 55 days.

(21) Appl. No.: 13/288,436

(22) Filed: Nov. 3, 2011

(65) Prior Publication Data

US 2012/0163513 A1   Jun. 28, 2012

(30) Foreign Application Priority Data

Dec. 22, 2010  (KR) ................. 10-2010-0132559

(51) Int. Cl.
*H04L 27/06* (2006.01)
*H03D 1/00* (2006.01)

(52) U.S. Cl.
USPC ........... 375/341; 375/262; 375/316; 375/324; 375/340

(58) Field of Classification Search
USPC ................. 375/316, 341, 262, 324, 340
See application file for complete search history.

(56) References Cited

U.S. PATENT DOCUMENTS

2003/0086366 A1*  5/2003  Branlund et al. ............. 370/208
2008/0279298 A1*  11/2008  Ben-Yishai et al. .......... 375/261

OTHER PUBLICATIONS

Agrell et al., *Closest Point Searches in Lattices*, IEEE Transactions on Information Theory, vol. 48, No. 8, Aug. 2002 (pp. 2201-2214).
Damen et al., *On Maximum-Likelihood Detection and the Search for the Closest Lattice Point*, IEEE Transactions on Information Theory, vol. 49, No. 10, Oct. 2003 (pp. 2389-2402).

* cited by examiner

*Primary Examiner* — Ted Wang
(74) *Attorney, Agent, or Firm* — Staas & Halsey LLP (57) ABSTRACT

Disclosed are a method and apparatus of adaptive transmission signal detection based on a signal-to-noise ratio and a Chi-squared distribution for decoding a reception signal in the form of multi-streams into a transmission signal, the method comprising: receiving a reception signal vector; estimating a channel matrix of a channel that the reception signal vector experienced; performing QR decomposition based on the estimated channel matrix; calculating dimensions of divisional spaces adaptively on the basis of a signal-to-noise ratio (SNR) or a signal-to-interference noise ratio (SINR); detecting a maximum likelihood point having a maximum likelihood value among lattice points within each divisional space obtained on the basis of results from performing the QR decomposition and calculating dimension of the divisional spaces; and recovering a transmission signal vector based on the detected maximum likelihood points.

15 Claims, 5 Drawing Sheets

METHOD AND APPARATUS OF ADAPTIVE TRANSMISSION SIGNAL DETECTION BASED ON SIGNAL-TO-NOISE RATIO AND CHI-SQUARED DISTRIBUTION

CROSS-REFERENCE TO RELATED APPLICATIONS

This application claims the benefit of priority of Korean Patent application No. 10-2010-0132559 filed on Dec. 22, 2010, which is incorporated by reference in their entirety herein.

BACKGROUND OF THE INVENTION

1. Field of the Invention

The present invention relates to signal processing, and more particularly, to a method and apparatus of adaptive transmission signal detection based on a signal-to-noise ratio and a Chi-squared distribution for decoding a reception signal of a multi-stream into a transmission signal.

2. Related Art

When a signal is transmitted and received between a transmitter and a receiver in a communication system, the signal may be transmitted or received in the form of a plurality of signal streams. That is, the transmitter such as a base station, a terminal, a relay, etc. generates and transmits the plurality of signal streams, and the plurality of signal streams are received at the receiver through a channel. If the receiver is configured by an apparatus of one or more receiver unit, the plurality of transmitted signal streams are output in the form of a reception signal vector at the receiver for every unit time and input to a detector or a decoder of the receiver.

As a method for detecting an original transmission signal from a plurality of received signals, there have been proposed various methods in consideration of detection error and calculation amount. To obtain the lowest detection error, a maximum likelihood detection may be used. As an algorithm for acquiring the maximum likelihood performance, a sphere decoding may be employed. The sphere decoding may be referred to M. O. Damen and H. El Gamal, "On Maximum-Likelihood Detection and the search for the closest lattice point", IEEE Trans. Inform. Theory, vol. 49, no. 10, pp. 2389-2402, OCT. 2003 and E. Agrell, T. Errikson, A. Vardy, and K. Zeger, "Closest point search in lattices," IEEE Trans. Inform. Theory, vol. 48, pp. 2201-2214, August 2002. The sphere decoding guarantees the maximum likelihood performance, but has a shortcoming that the calculation amount is largely varied depending on a condition of channel matrix, particularly a condition number, multiplied to a transmission signal vector or depending on a signal-to-noise ratio (SNR). For example, if the condition number of the channel matrix is approximate to 1 and the SNR is not low, the calculation amount is small as compared with those of other detection methods. On the other hand, if a channel condition is bad or the SNR is low, the calculation amount is so large that a detection time is delayed or an algorithm is not sufficiently performed if there is assigned a limit delay time. The calculation amount in the sphere decoding is generally determined on the basis of an initial radius.

Accordingly, there is a need of a signal processing method in which an algorithm in a sphere decoding and an algorithm of adaptively controlling the calculation amount in the sphere decoding are combined.

SUMMARY OF THE INVENTION

The present invention provides adaptive transmission signal detection based on a signal-to-noise ratio and a Chi-squared distribution for decoding a reception signal of a multi-stream into a transmission signal.

In an aspect, there is provided a method for adaptive transmission signal detection in a communication system, the method comprising: receiving a reception signal vector; estimating a channel matrix of a channel that the reception signal vector experiences; performing QR decomposition based on the estimated channel matrix; calculating dimensions of divisional spaces adaptively on the basis of a signal-to-noise ratio (SNR) or a signal-to-interference noise ratio (SINR); detecting a maximum likelihood point having a maximum likelihood value among lattice points within each divisional space obtained on the basis of results from performing the QR decomposition and calculating the dimensions of the divisional spaces; and recovering a transmission signal vector based on the detected maximum likelihood points.

The dimensions of the divisional spaces may be calculated on the basis of noise variance $\sigma^2$.

The dimensions of the divisional spaces may be calculated on the basis of a reference value of calculation amount C, a modulation order M, and B based on noise distribution characteristics.

The B may be a value based on Chi-squared distribution.

The reception signal vector may be determined on the basis of a transmission signal vector, a channel matrix and a noise vector.

The maximum likelihood point within each divisional space may be determined by the following Equation:

$$\hat{x} = \underset{x}{\operatorname{argmin}} \|v - Rx\|^2$$

where, v is a product of the reception signal vector y and a conjugate transpose matrix Q* of an orthogonal matrix Q obtained by performing the QR decomposition based on the channel matrix, R is an upper triangular matrix obtained by performing the QR decomposition based on the channel matrix, and x is the transmission signal vector.

The QR decomposition may be performed with regard to a matrix $$\begin{bmatrix} H \\ \frac{\theta}{\rho} I \end{bmatrix}$$

based on the estimated channel matrix, where, H is the estimated channel matrix, $0 \leq \theta \leq 3$, $\rho^2$ is a SNR, and I is an f×f identity matrix if the rank of H is f.

In another aspect, there is provided an apparatus for adaptive transmission signal detection, the apparatus comprising: a radio frequency (RF) unit configured to receive a reception signal vector; and a processor, coupled to the RF unit, and configured to estimate a channel matrix of a channel that the reception signal vector experiences, perform QR decomposition with regard to the estimated channel matrix, calculate dimensions of divisional spaces adaptively on the basis of a signal-to-noise ratio (SNR) or a signal-to-interference noise ratio (SINR), detect a maximum likelihood point having a maximum likelihood value among lattice points within each divisional space obtained on the basis of results from performing the QR decomposition and calculating dimensions of the divisional spaces, and recover a transmission signal vector based on the detected maximum likelihood points.

The dimensions of the divisional spaces may be calculated on the basis of noise variance $\sigma^2$.

The dimensions of the divisional spaces may be calculated on the basis of a reference value of calculation amount C, a modulation order M, and B based on noise distribution characteristics.

The B may be a value based on Chi-squared distribution.

The reception signal vector may be determined on the basis of a transmission signal vector, a channel matrix and a noise vector.

The maximum likelihood point within each divisional space may be determined by the following Equation:

$$\hat{x} = \underset{x}{\operatorname{argmin}} \|v - Rx\|^2$$

where, v is a product of the reception signal vector y and a conjugate transpose matrix $Q^*$ of an orthogonal matrix Q obtained by performing the QR decomposition based on the channel matrix, R is an upper triangular matrix obtained by performing the QR decomposition based on the channel matrix, and x is the transmission signal vector.

The QR decomposition may be performed with regard to a matrix $$\begin{bmatrix} H \\ \frac{\theta}{\rho}I \end{bmatrix}$$

based on the estimated channel matrix, where, H is the estimated channel matrix, $0 \leq \theta \leq 3$, $\rho^2$ is a SNR, and I is an f×f identity matrix if the rank of H is f.

In still another aspect, there is provided an apparatus for adaptive transmission signal detection, the apparatus comprising: a radio frequency (RF) unit which receives a reception signal vector; a signal-to-noise ratio (SNR) measuring unit which connects with the RF unit and measures an SNR or a signal-to-interference noise ratio (SINR); a divisional space dimension calculator which connects with the SNR measuring unit and calculates dimensions of divisional spaces adaptively on the basis of the measured SNR or SINR; a processor which connects with the RF unit, estimates a channel matrix of a channel that the reception signal vector experiences, and performs QR decomposition based on the estimated channel matrix; a maximum likelihood point detector which connects with the processor and the divisional space dimension calculator, and detects a maximum likelihood point having a maximum likelihood value among lattice points within each divisional space obtained on the basis of results from performing the QR decomposition and calculating dimensions of the divisional spaces; and a memory which connects with the processor and the maximum likelihood point detector, and stores the detected maximum likelihood point of each divisional space.

DESCRIPTION OF EXEMPLARY EMBODIMENTS

Hereinafter, some embodiments of the present invention are described in detail with reference to the accompanying drawings in order for those skilled in the art to be able to readily implement the invention. However, the present invention may be modified in various different ways and are not limited to the following embodiments. In order to clarify a description of the present invention, parts not related to the description are omitted, and the same reference numbers are used throughout the drawings to refer to the same or like parts. Further, a description of parts which can be easily understood by those skilled in the art is omitted.

When it is said that any part "includes (or comprises)" any constituent element, it means that the corresponding part may further include other constituent elements unless otherwise described without excluding other constituent elements.

Hereinafter, an adaptive signal processing method for multi-stream decoding, based on a signal-to-noise ratio (SNR) and a Chi-squared distribution, will be described. The present invention proposes a new signal processing method in which a sphere decoding used as an algorithm for obtaining the maximum likelihood performance and an algorithm for controlling the calculation amount of the sphere decoding are combined.

In the case where a transmitter transmits one or more signal streams or a plurality of transmitter transmits signals, a reception signals received by a receiver may be expressed in the form of a reception signal vector received per unit time. At this time, the reception signal vector can be calculated by the following Equation 1.

$$y = Hx + z, \; y = \begin{bmatrix} y_1 \\ y_2 \\ \vdots \\ y_m \end{bmatrix}, \; x = \begin{bmatrix} x_1 \\ x_2 \\ \vdots \\ x_n \end{bmatrix}, \quad \text{[Equation 1]}$$

$$z = \begin{bmatrix} z_1 \\ z_2 \\ \vdots \\ z_m \end{bmatrix}, \; H = [H_{ij}]_{m \times n}$$

where, x is a transmission signal vector, y is a reception signal vector, z is a noise vector, and H is a channel matrix that a signal experiences. y and z are vectors having a length of m, and x is a vector having a length of n. H is an m×n matrix (e.g., m≥n). Assume that signals constituting z are independent of one another and have the same distribution, and the corresponding distribution is a circularly-symmetric complex normal distribution. A measured variance of signals $z_i$ constituting z may be represented with $\sigma^2$. For convenience of description, H and x are a matrix and a vector in which a variance of elements representing the strength is assumed to be 1. Referring to the Equation 1, the reception signal vector is obtained by multiplying the transmission signal vector by the channel matrix and adding the noise vector thereto.

Also, in the case where a plurality of transmission signal vectors constitute one code matrix, there is one reception signal corresponding to one transmitting code matrix. The reception signal matrix may be calculated similarly to the form of the reception signal vector calculated in the Equation 1. That is, the reception signal matrix is obtained by multiplying the transmitting code matrix by the channel matrix and adding a noise matrix thereto. The calculation of the reception signal matrix may be represented like the following Equation 2.

$$Y = HC(x_1, x_2, \ldots, x_s) + Z \qquad \text{[Equation 2]}$$

where, $C(x_1, x_2, \ldots, x_s)$ indicates a transmission code matrix, Y is a reception signal matrix, z is a noise matrix, and H is a channel matrix a signal experiences. At this time, the transmission code matrix may be obtained by applying conjugation, rotation, linear transform, etc. to s signals. If Y is an m×T matrix, Z is also an m×T matrix, in which elements constituting Z are independent of one another and have the same distribution and a variance of $\sigma^2$. Meanwhile, the Equation 2 may be represented by the following Equation 3 using an effective channel matrix $\tilde{H}$ be multiplied with s signals $x_1, x_2, \ldots, x_s$ from $HC(x_1, x_2, \ldots, x_s)$.

$$\tilde{y} = \tilde{H} \begin{bmatrix} x_1 \\ x_2 \\ \vdots \\ x_s \end{bmatrix} + \tilde{z} \qquad \text{[Equation 3]}$$

where, $\tilde{y}$ and $\tilde{z}$ are vectors having the same number of rows and columns as the effective channel matrix $\tilde{H}$. Referring to the Equation 3, it is similar to the form of the Equation 1. That is, before the receiver detects s signals $x_1, x_2, \ldots, x_s$, it is possible to obtain $\tilde{y}$ and the effective channel matrix $\tilde{H}$ from Y, H and $C(x_1, x_2, \ldots, x_s)$ of the Equation 2. Accordingly, even if a plurality of transmission signal vectors forms a code matrix, it is possible to apply the model of the Equation 1 on the basis of the effective channel matrix of the Equation 3. That is, even though the coding is applied between transmission signal streams, a detection method based on the Equation 1 may be used on the basis of the Equation 3. In the following exemplary embodiment, the adaptive signal processing method or detection method to be described below are applied on the basis of the model of the Equation 1, but not limited thereto and may be alternatively based on the model of the Equation 2.

Referring back to the Equation 1, QR decomposition is performed to decompose a predetermined matrix into an orthogonal matrix and an upper triangular matrix with regard to H, thereby obtaining Q and R (where, H=QR). Also, the QR decomposition may be performed with regard to a H-based matrix $$\begin{bmatrix} H \\ \frac{\theta}{\rho} I \end{bmatrix},$$

thereby obtaining Q and R (where, $$\begin{bmatrix} H \\ \frac{\theta}{\rho} I \end{bmatrix} = QR,$$

$0 \le \theta \le 3$, $\rho^2$ is a SNR, and I is an f×f identity matrix if a rank of H is f). Further, if both sides of the Equation 1 are multiplied by Q* as a conjugate transpose matrix of Q, it can be shown as the following Equation 4.

$$Q^*y = Rx + Q^*z \qquad \text{[Equation 4]}$$

where, Q is an orthogonal matrix of which columns are orthogonal to one another and Euclidean magnitude of each column is 1, and R is an upper triangular matrix.

If v=Q*y, w=Q*z, the Equation 4 can be represented by the following Equation 5.

$$v = Rx + w \qquad \text{[Equation 5]}$$

Elements of w have variance of $\sigma^2$ like that of z. The receiver obtains Q and R by applying the QR decomposition to the matrix H obtained by estimation, and multiplies the reception signal vector y by Q*. At this time, H has a rank of n, so that v and w have a length of n and R is an n×n matrix. The $i^{th}$ element of v, the $i^{th}$ element of w, and an element corresponding to the $i^{th}$ row and the $j^{th}$ column of R can be represented by $v_i$, $w_i$, and $R_{ij}$, respectively.

Meanwhile, for convenience of the following description, a sub-matrix including rows $i_1$ to $i_2$ and columns $j_1$ to $j_2$ of the matrix A will be represented with $A[i_1:i_2][j_1:j_2]$. A sub-vector including rows $i_1$ to $i_2$ of the vector b will be represented with $b[i_1:i_2]$. Also, a set of lattice points where the transmission signal vector x belongs will be represented with D. Therefore, the set of lattice points to which $x[i_1:i_2]$ belongs can be represented with $D[i_1:i_2]$. In the case of substituting a certain value a for a variable A, it can be represented with $A \leftarrow a$.

Referring back to the Equation 5, it is possible to obtain the most adaptive transmission signal $\hat{x}$ corresponding to the signal v in accordance with distribution characteristics of the noise vector. $\hat{x}$ is a lattice point for the maximum likelihood value, which may also be called a maximum likelihood point. $\hat{x}$ can be obtained by the following Equation 6.

$$\hat{x} = \arg\min_{x} \|v - Rx\|^2 \qquad \text{[Equation 6]}$$

The sphere decoding calculates the maximum likelihood point satisfying the Equation 6 on the basis of given inputs R and v. Below, a procedure of calculating the maximum likelihood point will be described. First, $\|v-Rx\|^2$ is calculated with regard to a plurality of lattice points x. If a temporary value of $$\min_{x} \|v - Rx\|^2$$

is $r^2$, $r^2$ is calculated whenever calculating $\|v-Rx\|^2$ with regard to a new lattice point x, and the maximum likelihood point is found out from x satisfying $\|v-Rx\|^2 \le r^2$ with respect to the calculated $r^2$. At this time, an initial value of $r^2$ is obtained by obtaining $\tilde{x}$ through zero forcing successive interference cancellation (ZF-SIC) using the structure of R and then calculating $\|v-R\tilde{x}\|^2$. If the initial value of r is relatively large, the number of lattice points to experience the sphere decoding algorithm becomes larger. Therefore, time or the calculation amount to be taken in finding out the maximum likelihood point increases. To reduce the variation of the calculation amount and reduce the calculation amount, the Equation 5 and the dimension of the space which contains the lattice points of transmission signal are divided, and it is then possible to find out the maximum likelihood point corresponding to each divisional space. Here, the Equation 5 is adaptively divided using the SNR and the variance $\sigma^2$ of noise, so that a solution approximating to the maximum likelihood point $\tilde{x}$ can be obtained while controlling the calculation amount. Alternatively, signal-to-interference noise ratio (SINR) may be used instead of the SNR. A procedure of dividing the Equation 5 through the SNR and $\sigma^2$ is as follows.

1) Set up a reference value of calculation amount C, and set up α proportional to the product Mπ of a modulation order M and the ratio π of the circumference of a circle to its diameter. Also, substitute n for i.
2) Set up b between 0 and 1, and substitute P with a value calculated as shown in the following Equation 7

$$B = (n - i + 1 - b)\sigma^2, \quad P \leftarrow \frac{(\alpha B)^{(n-i+1)/2}}{((n-i+1)/2)!} \quad \text{[Equation 7]}$$

Where, B is based on noise distribution, using Chi-squared distribution. Here, some of the values from the Chi-squared distribution table may be stored in a memory, and B may be a value stored in the memory. B may be substituted with another value of the Chi-squared distribution table.

3) Compare P and C, and perform a step 5) if P is greater than C or i≤1 and perform a step 4) if P is smaller than C and i>1.
4) Decrease i by 1. That is, i−1→i
5) Substitute $\bar{n}$ with n−i+1. If n is divisible by $\bar{n}$, substitute k with a quotient of n divided by $\bar{n}$, and let $n_1 = n_2 = \ldots = n_k = \bar{n}$. If n is not divisible by $\bar{n}$, substitute k with a value obtained by adding 1 to a quotient of n divided by $\bar{n}$, and let $n_1 = n - (k-1)\bar{n}$, $n_2 = n_3 = \ldots = n_k = \bar{n}$.
6) Substitute 1 with k. Obtain $\hat{x}_k$ satisfying the following Equation 8 based on $R[n-n_k+1:n]$ and $v[n-n_k+1:n]$ given as an input of the sphere coding algorithm.

$$\hat{x}_k = \arg \min_{x[n-n_k+1:n] \in D[n-n_k+1:n]} \left\| \begin{array}{c} v[n - n_k + 1 : n] - R[n - n_k + 1 : n] \\ [n - n_k + 1 : n] x[n - n_k + 1 : n] \end{array} \right\|^2 \quad \text{[Equation 8]}$$

7) If l=1, output $$\begin{bmatrix} \hat{x}_l \\ \vdots \\ \hat{x}_k \end{bmatrix}$$

and terminate. Otherwise, perform a step 8).
8) Substitute l←l−1, and calculate $\bar{v}_l$ and $\bar{R}_l$ by the following Equations 9 and 10, respectively.

$$\bar{v}_l \leftarrow v\left[n - \sum_{j=l}^{k} n_j + 1 : n - \sum_{j=l+1}^{k} n_j\right] - \quad \text{[Equation 9]}$$

$$R\left[n - \sum_{j=l}^{k} n_j + 1 : n - \sum_{j=l+1}^{k} n_j\right]\left[n - \sum_{j=l+1}^{k} n_j + 1 : n\right] \begin{bmatrix} \hat{x}_l \\ \vdots \\ \hat{x}_k \end{bmatrix}$$

$$\bar{R}_l = \quad \text{[Equation 10]}$$

$$R\left[n - \sum_{j=l}^{k} n_j + 1 : n - \sum_{j=l+1}^{k} n_j\right]\left[n - \sum_{j=l}^{k} n_j + 1 : n - \sum_{j=l+1}^{k} n_j\right]$$

9) Let $$x\left[n - \sum_{j=l}^{k} n_j + 1 : n - \sum_{j=l+1}^{k} n_j\right]$$

be $x_l$ and a set including $x_l$ be $D_l$. Obtain $\hat{x}_l$ by the following Equation 11 using $\bar{v}_l$ and $\bar{R}_l$ as input values for the sphere decoding algorithm.

$$\hat{x}_l = \arg \min_{x_l \in D_l} \|\bar{v}_l - \bar{R}_l x_l\|^2 \quad \text{[Equation 11]}$$

Perform the step 7) again.

In the foregoing description, the sphere decoding algorithm is used for obtaining the sub-vector $\hat{x}_1, \ldots, \hat{x}_k$, but not limited thereto. Alternatively, other detection methods may be used instead of the sphere decoding.

Figure 1:
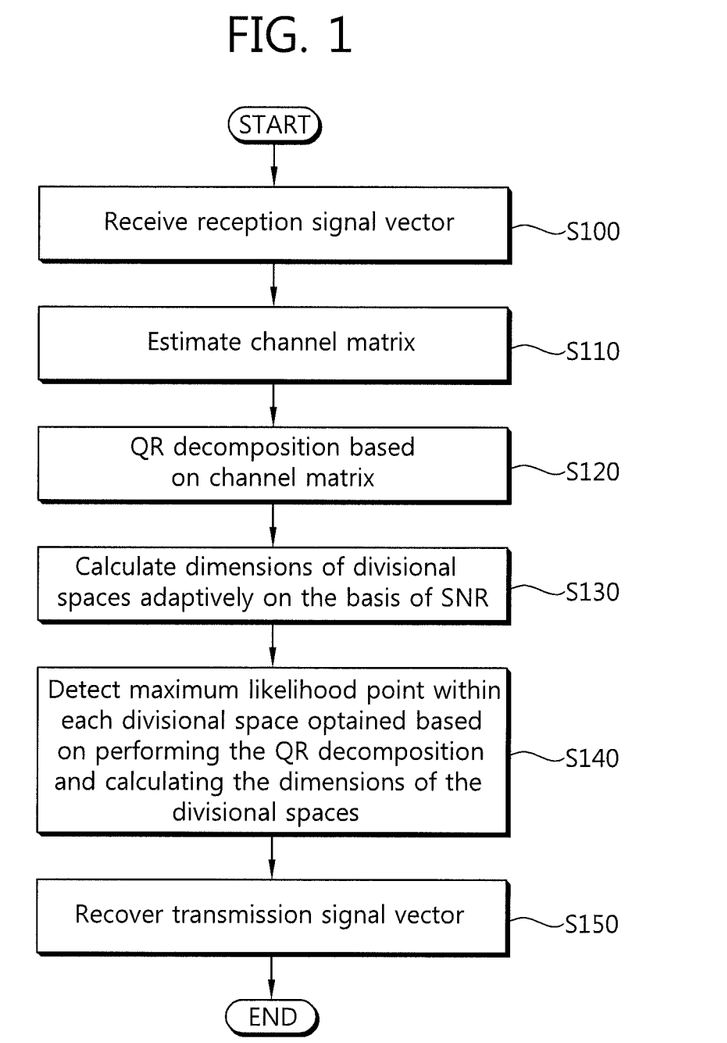
FIG. 1 is a block diagram illustrating an exemplary embodiment of a proposed method for adaptive transmission signal detection.

FIG. 1 is a block diagram illustrating an exemplary embodiment of a proposed method for adaptive transmission signal detection.

At operation S100, the receiver receives a reception signal vector. At operation S110, the receiver estimates a channel matrix. At operation S120, the receiver performs the QR deposition based on the estimated channel matrix. At operation S130, the receiver adaptively calculates the dimensions of the divisional spaces on the basis of the SNR. Here, the dimensions of the divisional space can be calculated on the basis of noise distribution, a reference value of calculation amount, a modulation order, and a value of the Chi-squared distribution table. At operation S140, the receiver detects the maximum likelihood point having a maximum likelihood value among the lattice points within each divisional space obtained on the basis of results from performing the QR decomposition and calculating dimensions of the divisional spaces. At operation S150, the receiver recovers a transmission signal vector based on the detected maximum likelihood points.

Figure 2:
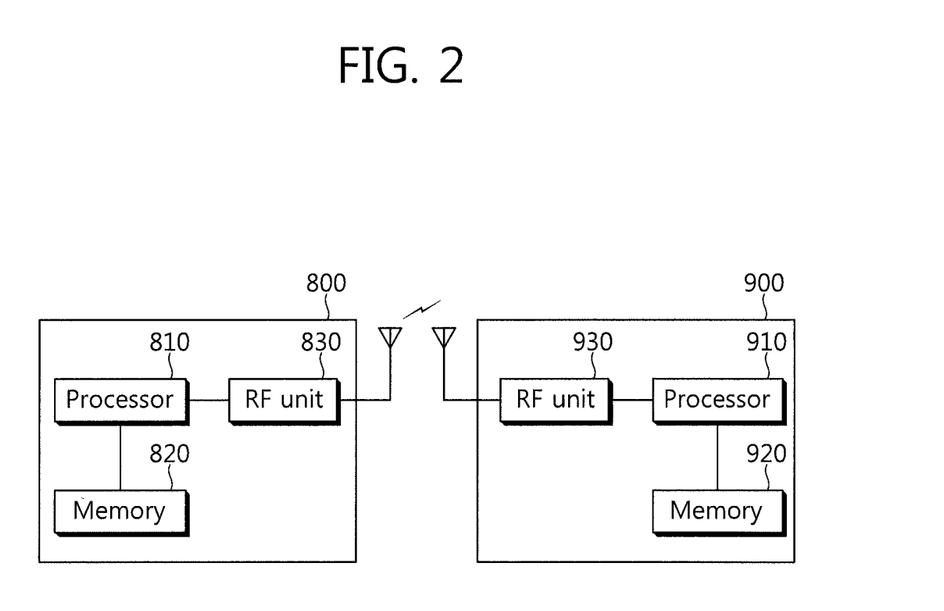
FIG. 2 is a block diagram showing wireless communication system to implement an embodiment of the present invention.

FIG. 2 is a block diagram showing wireless communication system to implement an embodiment of the present invention.

A transmitter 80 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

Figure 3:
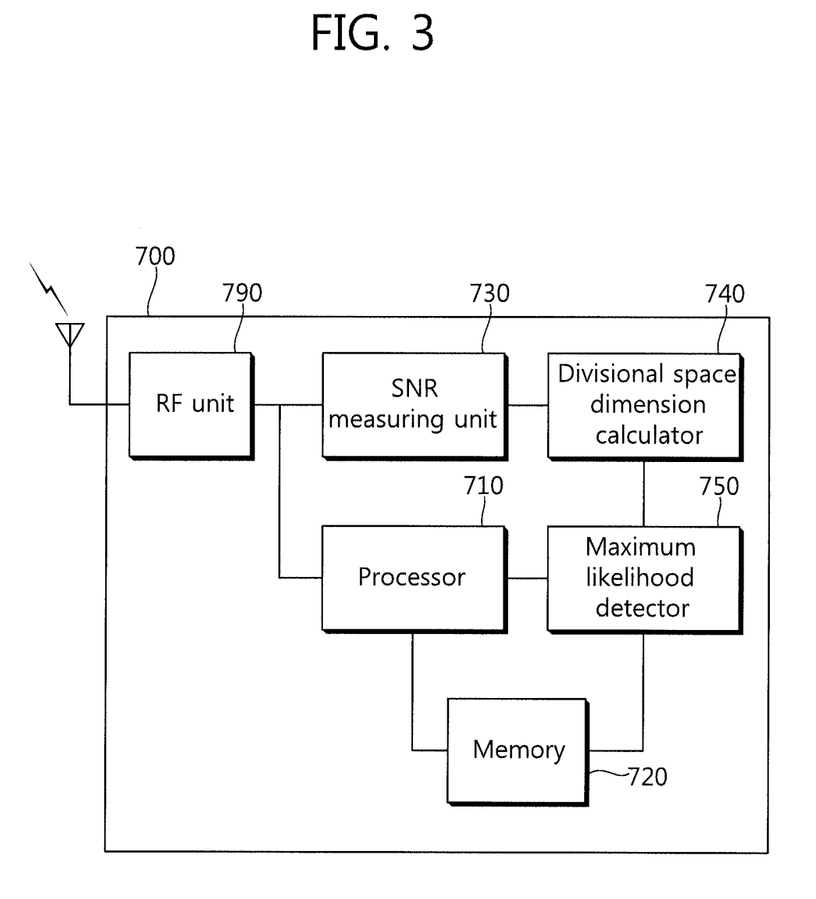
FIG. 3 is a block diagram of the receiver in which an exemplary embodiment of the present invention is realized.

FIG. 3 is a block diagram of the receiver in which an exemplary embodiment of the present invention is realized.

Referring to FIG. 3, a receiver 700 includes a processor 710, a memory 720, an SNR measuring unit 730, a divisional space dimension calculator 740, a maximum likelihood point detector 750, and a radio frequency (RF) unit 790. The RF unit 790 receives a reception signal vector. The SNR measuring unit 730 is connected to the RF unit 790, and measures an SNR or an SINR. The divisional space dimension calculator 740 is connected to the SNR measuring unit 730, and adaptively calculates the dimensions of the divisional spaces on the basis of the measured SNR or SINR. The processor 710 is connected to the RF unit 790, and estimates a channel matrix of channels that the reception signal vector experiences, thereby performing the QR decomposition on the basis of the estimated channel matrix. The maximum likelihood point detector 750 is connected to the processor 710 and the divisional space dimension calculator 740, and detects the maximum likelihood point having the maximum likelihood value among the lattice points within each divisional space obtained on the basis of the results from performing the QR decomposition and calculating dimensions of the divisional spaces. The memory 720 is connected to the processor 710 and the maximum likelihood point detector 750, and stores the detected maximum likelihood point of each divisional space. The processor 710 recovers the transmission signal vector on the basis of the maximum likelihood point of each divisional space, stored in the memory 720.

Figure 4:
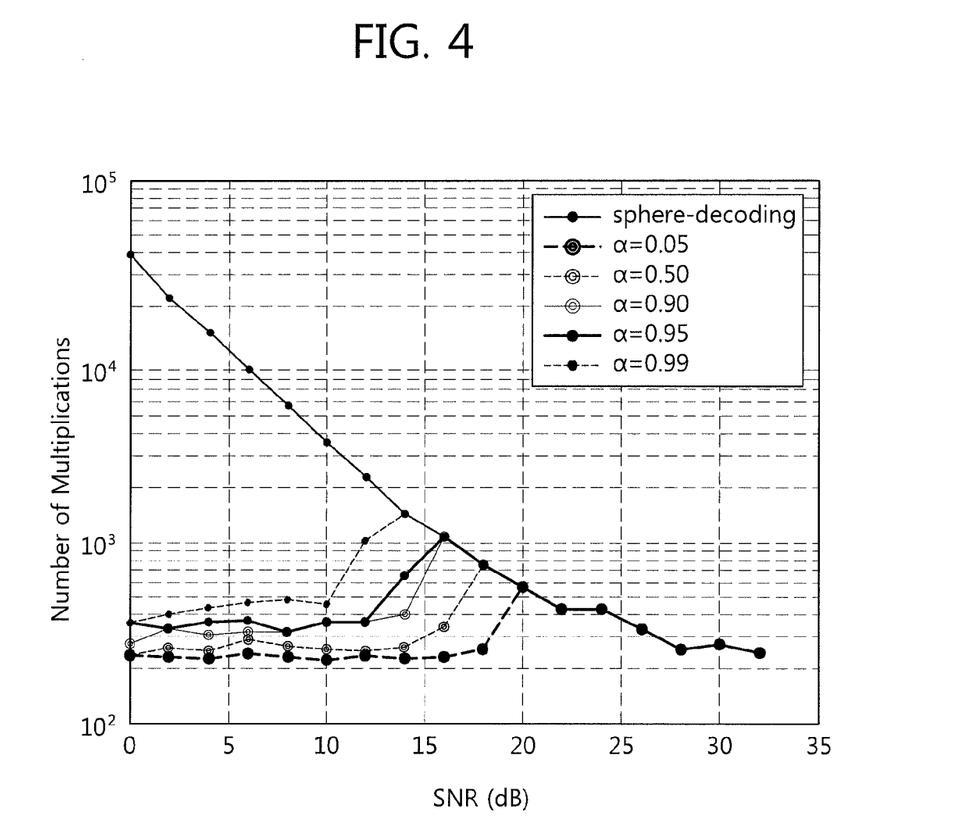
FIGS. 4 and 5 are graphs showing performance improvement of when the present invention is embodied.
Figure 5:
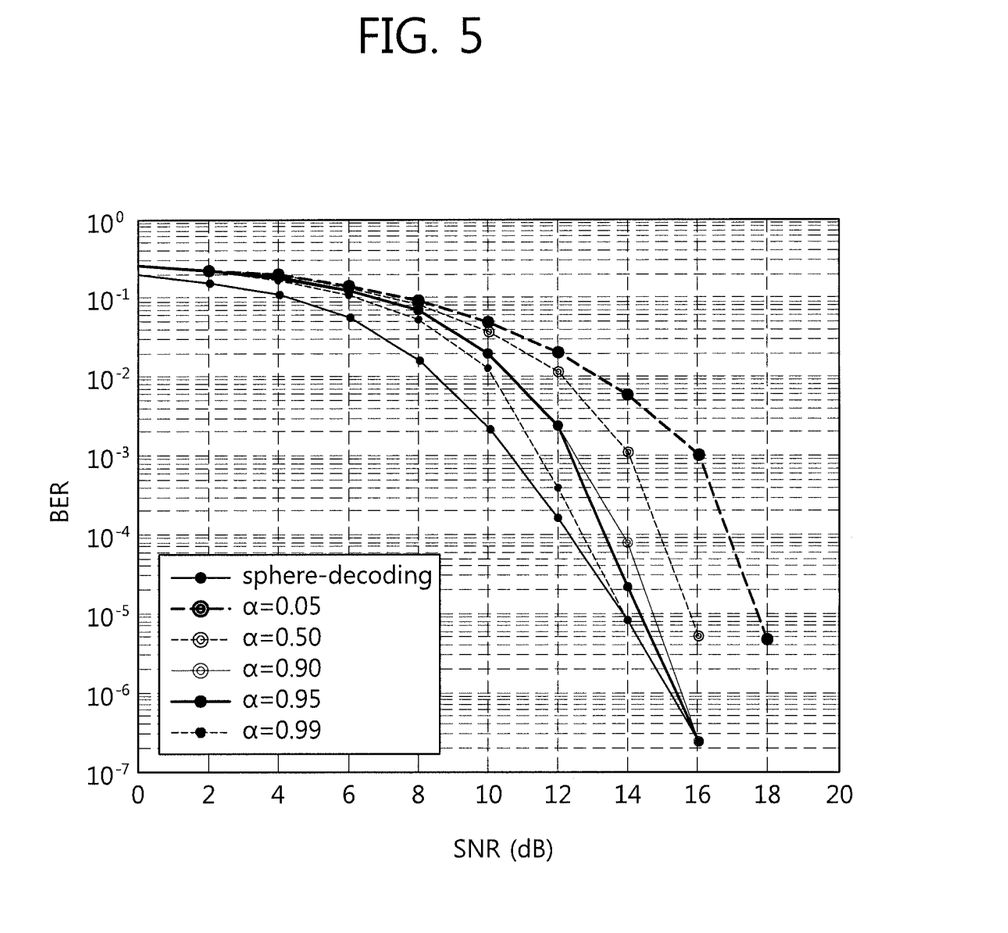

FIGS. 4 and 5 are graphs showing performance improvement of when the present invention is embodied.

A communication system including eight transmitting antennas and eight receiving antennas is assumed as an experimental condition. Each transmitting antenna transmits one arbitrary symbol among 16 quadrature amplitude modulation (QAM) symbols per unit time. Accordingly, eight data streams are formed, and the receiver having eight receiving antennas receives eight data streams to thereby detect a transmission signal by the detection method according to the present invention. Let $\alpha=M\pi$, b=0.66, $C=16^2$. A channel between the transmitter and the receiver is an 8×8 matrix of which each element is Rayleigh fading. Let the SNR range from 0 to 32 dB. The calculation amount and a bit error rate (BER) curve based on variance of the SNR were compared with those of the existing sphere decoding algorithm.

FIG. 4 is a graph illustrating comparison in an average calculation amount based on the SNR between the proposed detection method and the sphere decoding. Referring to FIG. 4, it will be appreciated that the average calculation amount of the proposed detection method is significantly smaller than that of the sphere decoding when the SNR is low.

FIG. 5 is a graph illustrating the comparison in BER performance between the proposed detection method and the sphere decoding. Referring to FIG. 5, it will be understood that there is little difference in the BER performance even though the average calculation amount of the proposed detection method is significantly smaller than that of the sphere decoding when the SNR is low.

As apparent from the foregoing description, the calculation amount of the sphere decoding is controlled to efficiently detect a transmission signal.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for adaptive transmission signal detection in a communication system, the method comprising:
   receiving a reception signal vector;
   estimating, by a processor, a channel matrix of a channel that the reception signal vector experienced;
   performing, by the processor, QR decomposition based on the estimated channel matrix;
   calculating dimensions of divisional spaces adaptively on the basis of a signal-to-noise ratio (SNR) or a signal-to-interference noise ratio (SINR);
   detecting, by the processor, a maximum likelihood point having a maximum likelihood value among lattice points within each divisional space obtained on the basis of results from performing the QR decomposition and calculating the dimensions of the divisional spaces; and recovering, by the processor, a transmission signal vector based on the detected maximum likelihood points.

2. The method of claim 1, wherein the dimensions of the divisional spaces are calculated on the basis of noise variance $\sigma^2$.

3. The method of claim 1, wherein the dimensions of the divisional spaces are calculated on the basis of a reference value of calculation amount C, a modulation order M, and B based on noise distribution characteristics.

4. The method of claim 3, wherein the B is a value based on Chi-squared distribution.

5. The method of claim 1, wherein the reception signal vector is determined on the basis of a transmission signal vector, a channel matrix and a noise vector.

6. The method of claim 1, wherein the maximum likelihood point within each divisional space is determined by the following equation:

$$\hat{x} = \mathrm{argmin}_x \|v - Rx\|^2$$

where, v is a product of the reception signal vector y and a conjugate transpose matrix Q* of an orthogonal matrix Q obtained by performing the QR decomposition based on the channel matrix, R is an upper triangular matrix obtained by performing the QR decomposition based on the channel matrix, and x is the transmission signal vector.

7. The method of claim 1, wherein the QR decomposition is performed with regard to a matrix $$\begin{bmatrix} H \\ \frac{\theta}{\rho} I \end{bmatrix}$$

based on the estimated channel matrix, where, H is the estimated channel matrix, $0 \leq \theta \leq 3$, $\rho^2$ is a SNR, and I is an f×f identity matrix if a rank of H is f.

8. An apparatus for adaptive transmission signal detection, the apparatus comprising:
a radio frequency (RF) unit configured to receive a reception signal vector; and
a processor, coupled to the RF unit, and configured to:
estimate a channel matrix of a channel that the reception signal vector experienced,
perform QR decomposition with regard to the estimated channel matrix,
calculate dimensions of divisional spaces adaptively on the basis of a signal-to-noise ratio (SNR) or a signal-to-interference noise ratio (SINR),
detect a maximum likelihood point having a maximum likelihood value among lattice points within each divisional space obtained on the basis of results from performing the QR decomposition and calculating the dimensions of the divisional spaces, and
recover a transmission signal vector based on the detected maximum likelihood points.

9. The apparatus of claim 8, wherein the dimensions of the divisional spaces are calculated on the basis of noise variance $\sigma^2$.

10. The apparatus of claim 8, wherein the dimensions of the divisional spaces are calculated on the basis of a reference value of calculation amount C, a modulation order M, and B based on noise distribution characteristics.

11. The apparatus of claim 10, wherein the B is a value based on Chi-squared distribution.

12. The apparatus of claim 8, wherein the reception signal vector is determined on the basis of a transmission signal vector, a channel matrix and a noise vector.

13. The apparatus of claim 8, wherein the maximum likelihood point within each divisional space is determined by the following expression:

$$\hat{x} = \mathrm{argmin}_x \|v - Rx\|^2$$

where, v is a product of the reception signal vector y and a conjugate transpose matrix Q* of an orthogonal matrix Q obtained by performing the QR decomposition based on the channel matrix, R is an upper triangular matrix obtained by performing the QR decomposition based on the channel matrix, and x is the transmission signal vector.

14. The apparatus of claim 8, wherein the QR decomposition is performed with regard to a matrix $$\begin{bmatrix} H \\ \frac{\theta}{\rho} I \end{bmatrix}$$

based on the estimated channel matrix, where, H is the estimated channel matrix, $0 \leq \theta \leq 3$, $\rho^2$ is a SNR, and I is an f×f identity matrix if a rank of H is f.

15. An apparatus for adaptive transmission signal detection, the apparatus comprising:
a radio frequency (RF) unit which receives a reception signal vector;
a signal-to-noise ratio (SNR) measuring unit which connects with the RF unit and measures an SNR or a signal-to-interference noise ratio (SINR);
a divisional space dimension calculator which connects with the SNR measuring unit and calculates dimensions of divisional spaces adaptively on the basis of the measured SNR or SINR;
a processor which connects with the RF unit, estimates a channel matrix of a channel that the reception signal vector experienced, and performs QR decomposition based on the estimated channel matrix;
a maximum likelihood point detector which connects with the processor and the divisional space dimension calculator, and detects a maximum likelihood point having a maximum likelihood value among lattice points within each divisional space obtained on the basis of results from performing the QR decomposition and calculating the dimensions of the divisional spaces; and
a memory which connects with the processor and the maximum likelihood point detector, and stores the detected maximum likelihood point of each divisional space.

* * * * *